US012537298B2

(12) United States Patent
Nguyen et al.

(10) Patent No.: US 12,537,298 B2
(45) Date of Patent: Jan. 27, 2026

(54) THERMAL LOAD BALANCING FOR ELECTRONICALLY STEERABLE ANTENNAS

(71) Applicant: Panasonic Avionics Corporation, Irvine, CA (US)

(72) Inventors: Anh Nguyen, Fullerton, CA (US); Larry Glick, Carlsbad, CA (US)

(73) Assignee: Panasonic Avionics Corporation, Irvine, CA (US)

(*) Notice: Subject to any disclaimer, the term of this patent is extended or adjusted under 35 U.S.C. 154(b) by 278 days.

(21) Appl. No.: 18/163,730

(22) Filed: Feb. 2, 2023

(65) Prior Publication Data

US 2024/0266728 A1 Aug. 8, 2024

(51) Int. Cl.
*H01Q 1/28* (2006.01)
*H01Q 3/34* (2006.01)
*H01Q 21/00* (2006.01)

(52) U.S. Cl.
CPC .................................... *H01Q 3/34* (2013.01)

(58) Field of Classification Search
CPC .. H01Q 1/02; H01Q 1/28; H01Q 1/32; H01Q 1/38; H01Q 1/42; H01Q 3/34; H01Q 3/36; H01Q 21/00
See application file for complete search history.

(56) References Cited

U.S. PATENT DOCUMENTS

| | | | | |
|---|---|---|---|---|
| 8,334,809 | B2 * | 12/2012 | Nichols | H01Q 1/3275 343/700 MS |
| 9,244,155 | B2 * | 1/2016 | Bielas | G01S 7/006 |
| 10,320,089 | B2 * | 6/2019 | Jakoby | H01Q 3/34 |
| 10,651,566 | B2 * | 5/2020 | Adams | G01S 13/02 |
| 10,714,840 | B1 * | 7/2020 | West | H01Q 21/30 |
| 10,833,408 | B2 * | 11/2020 | Paulsen | H01Q 3/40 |
| 11,677,140 | B2 * | 6/2023 | Stoleru | H01Q 3/24 343/705 |
| 12,283,746 | B2 * | 4/2025 | Mak | H01Q 1/42 |

* cited by examiner

*Primary Examiner* — Tho G Phan
(74) *Attorney, Agent, or Firm* — Perkins Coie LLP

(57) ABSTRACT

Example embodiments disclosed herein relate to optimizing operation of an electronically steerable antenna (ESA) with respect to temperature-related constraints. Thermal load experienced by individual antenna elements or tiles of the ESA is balanced to maximize an expected time before the ESA reaches a shutdown temperature. An example method includes determining a reduced number of antenna tiles that minimally satisfies a signal quality requirement with respect to a target system. The method further includes selecting an optimized sequence of tile patterns of the reduced number of antenna tiles within the ESA. The optimized sequence corresponds to an optimized path that traverses a graph having nodes corresponding to the tile patterns and edges defining a count of shared tiles between respective tile patterns. The method further includes operating the ESA according to the optimized sequence of tile patterns based on activating specific tiles identified by each pattern in a sequential manner.

18 Claims, 7 Drawing Sheets

THERMAL LOAD BALANCING FOR ELECTRONICALLY STEERABLE ANTENNAS

TECHNICAL FIELD

This document relates to antenna technology deployable on a commercial passenger vehicle.

BACKGROUND

Antenna systems may be deployed on commercial passenger vehicles to provide communication capabilities with other extra-vehicular systems. As a commercial passenger vehicle and an extra-vehicle system, such as a low earth orbit (LEO) satellite, are in movement relative to one another, operation of the vehicle's antenna system to maintain communications therebetween is resource- and power-intensive. Improvements to antenna technology are needed to extend antenna-based vehicular communication capabilities.

SUMMARY

This document is related to operation of electronically controlled antenna arrays, and in particular, electronically steerable antennas (ESAs). In some embodiments, this document provides improvements to the operation of ESAs used by commercial passenger vehicles, including airplanes and others. While this document describes various embodiments in the context of ESAs, it will be understood that certain concepts and embodiments may be applicable to other antennas understood under other terminology, such as phased arrays, electronically scanned arrays, beam steering antennas, and/or the like.

In particular, the present document provides various techniques for balancing thermal load on antenna tiles of an electronically steerable antenna (ESA). According to example embodiments disclosed herein, only a subset of the antenna elements or antenna tiles of an ESA are activated and used at any time instance. An activated subset of antenna elements/tiles can manifest as a spatial pattern across the ESA, and periodically, different patterns of antenna elements/tiles are activated. Consecutive element/tile patterns may share common tiles, and the patterns are selected to minimize a number of common tiles between the consecutive element/tile patterns. In doing so, any given tile is given a maximized time to cool before being activated. Accordingly, embodiments disclosed herein provide technical improvements to antenna array operation, by optimizing cooling time for each individual antenna element or tile.

In one example aspect, a method of thermal load balancing for an ESA of a vehicle is disclosed. The ESA includes a total N number of antenna tiles. The method includes determining, by an antenna controller, a particular M number of antenna tiles for transmitting or receiving at least one communication signal via the ESA to or from a communications satellite, respectively. The particular M number of antenna tiles is less than the total N number of antenna tiles. The method further includes selecting, by the antenna controller, an optimized sequence of unique tile patterns of the particular M number of antenna tiles. That is, each unique tile pattern contains M out of the total N number of tiles. The optimized sequence corresponds to an optimized path that traverses a graph having (i) nodes corresponding to the unique tile patterns, and (ii) edges that define a count of shared tiles between different unique tile patterns. The optimized path minimizes the count of shared tiles (as defined by the graph edges) between consecutive tile patterns in the optimized path.

The method further includes operating, by the antenna controller, the ESA according to the optimized sequence of unique tile patterns to transmit or receive at least one communication signal via the ESA. For example, the antenna controller activates specific M tiles identified by a first tile pattern for a first time period, and then the antenna controller activates specific M tiles identified by a second tile pattern of the optimized sequence for a second time period subsequent to the first time period. As a result, a given tile identified by the first tile pattern and not identified by the second tile pattern is given time to rest and cool while the ESA is operated according to the second tile pattern.

In another example aspect, a method of optimizing operation of an antenna array that includes a number of antenna elements arranged adjacently is disclosed. The method includes determining a reduced number of antenna elements that minimally satisfies a signal quality requirement with respect to a target system. The method further includes selecting a sequence of element arrangements each identifying a different permutation of the reduced number of antenna elements within the antenna array. The sequence minimizes a count of common antenna elements between consecutive arrangements in order to maximize a non-operational time for a given antenna element. The method further includes coordinating operation of the antenna elements of the antenna array based on the element arrangements in accordance with the sequence.

In another example aspect, an antenna system for a vehicle is disclosed. The antenna system includes an ESA that includes antenna tiles operable in connection with one another to emit and/or receive directed communication signals. The antenna system further includes an antenna controller device that includes a processor. The processor executes instructions to cause the antenna controller device to determine a reduced number of antenna tiles of the ESA. The processor executes instructions to cause the antenna controller device to further select a sequence of patterns of the reduced number of antenna tiles that minimizes a count of common tiles between consecutive patterns in the sequence to allow for ambient cooling of the antenna tiles of the ESA. The processor executes instructions to cause the antenna controller device to further determine a dwelling time for each pattern of the sequence. The dwelling time defines a duration in which the ESA is operated according to a respective pattern. The processor executes instructions to cause the antenna controller device to further operate the reduced number of antenna tiles of the ESA according to the sequence of patterns and the dwelling time for each pattern to emit or receive a given directed communication signal.

In yet another aspect, a computer readable medium is disclosed. The computer readable medium stores processor-executable program code that, upon execution by one or more processors, causes implementation of a method described in the present document.

These, and other aspects are disclosed throughout the present document.

DETAILED DESCRIPTION

Figure 1A:
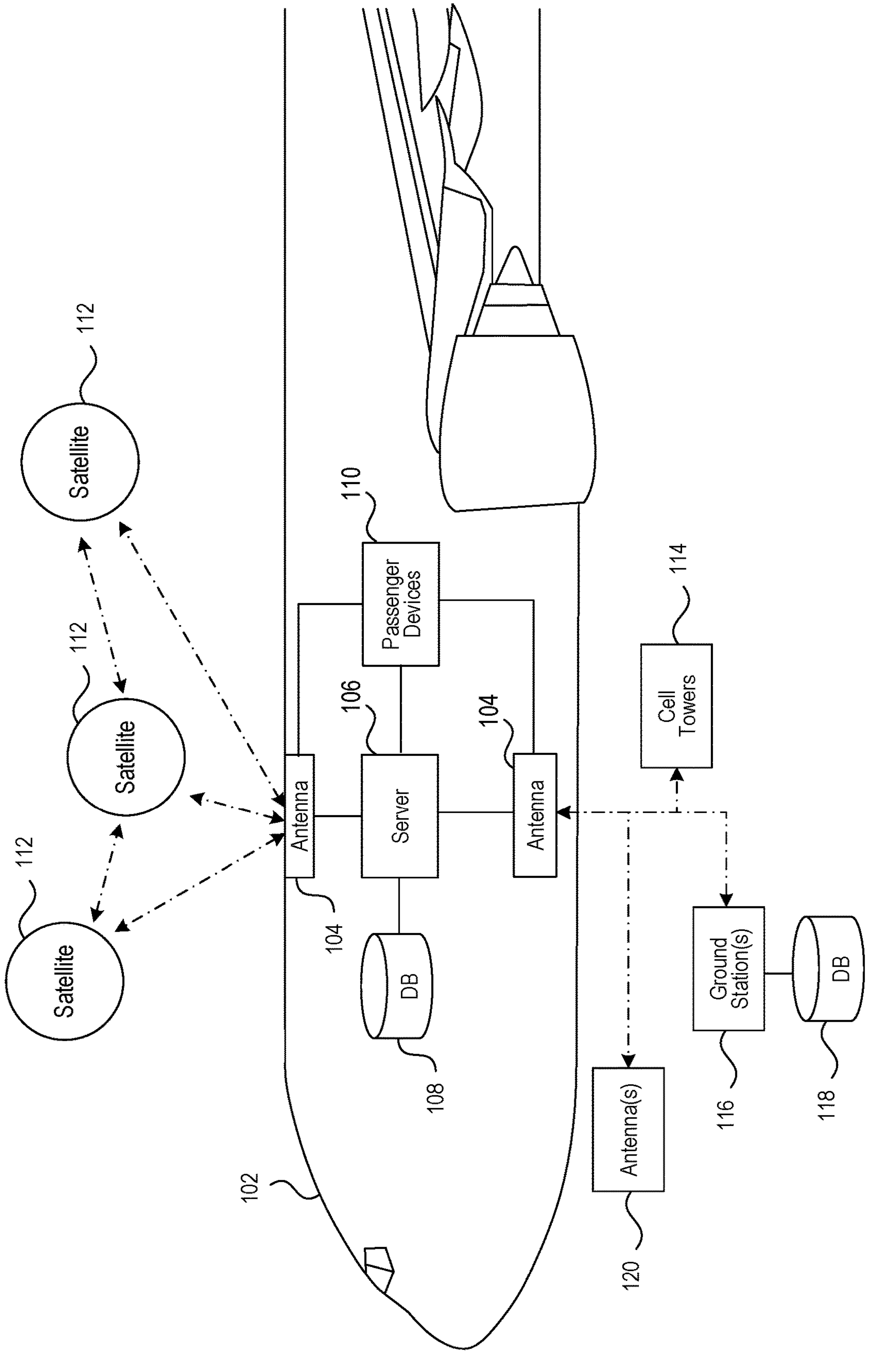
FIG. 1A shows an example vehicle that includes one or more antenna systems for extra-vehicular communications.

Antenna arrays that include multiple antenna elements may be used to support communications between commercial passenger vehicles and low earth orbit (LEO) satellite constellations. An antenna array, for example embodied as an electronically steerable antenna (ESA), can point in different directions without physically re-orienting or moving the antenna array itself. As a result, communication with LEO satellites and other terminals exhibiting mobility relative to an ESA, for example, can be maintained with reduced interruptions.

A characteristic of ESAs and similar antenna systems (e.g., phased arrays, electronically scanned arrays) is that they consume significant power and produce significant heat. When the antenna's temperature reaches its operating limits via continued use, the antenna can suffer permanent damage. An antenna's temperature more quickly reaches these temperature limits when located in particularly hot ambient environments. These temperature constraints present a technical challenge in the way of effective use of ESAs and similar antenna arrays.

According to example embodiments, the present disclosure provides solutions in which thermal load experienced by antenna elements or tiles of an antenna array is optimized, such that the antenna array can be operated for longer continuous time periods. The technical solutions provided by the present disclosure may improve antenna operations in hot ambient environments, in particular. For example, an aircraft having an antenna array and being grounded at an airport in a desert environment may be able to operate the antenna array for longer periods of time in accordance with the disclosed embodiments being implemented. A commercial passenger aircraft may then be capable of satisfying gate-to-gate connectivity requirements.

In order to optimize the thermal load experienced by antenna elements or tiles, example embodiments involve the selection of an optimized sequence of element/tile patterns for antenna array. Each pattern identifies specific individual antenna elements or tiles to be activated at a given time, and each pattern of the optimized sequence identifies a different and unique permutation of specific antenna elements/tiles. According to example embodiments, the sequence of patterns is optimized to minimize a number of common tiles between consecutive patterns in the sequence. By this optimization, any given tile has a maximized time to rest and cool, and overall, the expected time for the antenna array to reach a shutdown temperature is maximized.

In some embodiments, the sequence of patterns is determined based on a graph path optimization technique. In particular, a graph may be defined to include nodes corresponding to different element/tile patterns and edges that define the number of common tiles between respective patterns. A complete path through the graph that minimizes the "distance" traversed via the edges then represents the optimized sequence of element/tile patterns that minimizes common tiles between consecutive element/tile patterns and maximizes cooling time for individual elements/tiles. In some embodiments, optimized graph paths may be predetermined and retrieved to operate an antenna array in a reduced service mode on demand. Further to selecting an optimized sequence of element/tile patterns, example embodiments include determining a dwelling time for each pattern of the optimized sequence. The dwelling time defines the amount of time that the specific elements/tiles identified by a given pattern are activated before specific elements/tiles identified by another pattern are subsequently activated. Thus, in some embodiments, the optimized sequence and dwelling times define a mode of improved operation for the antenna array.

Thus, disclosed embodiments provide a dynamic power loading scheme for an antenna array that involves opportunistic switching of element/tile patterns, thereby maximizing cooling of inactive elements/tiles. Example embodiments disclosed herein may be applied to transmission and reception operations for an antenna array, and may be applied to each of a transmit aperture and a receive aperture. Example embodiments enable aircraft in-flight connectivity systems to provide communication services even in thermally challenging environments. While various embodiments disclosed herein may be discussed in the context of an aircraft that includes one or more antenna systems, it will be appreciated that disclosed concepts are generally applicable to other antenna systems in other (e.g., non-aircraft, non-vehicular) applications, environments, and implementations.

Referring now to FIG. 1A, an example of a vehicle 102 configured for extra-vehicular communications via one or more antenna systems 104 is illustrated. In some embodiments, the vehicle 102 and the one or more antenna systems 104 implement example thermal load balancing techniques disclosed herein in order for the vehicle 102 to maintain longer connectivity with other systems in thermally challenging environments. In the example, the vehicle is a commercial passenger vehicle, and specifically an aircraft.

In some embodiments, the one or more antenna systems 104 provide connectivity to extra-vehicular systems for in-vehicle systems, including one or more servers 106, one or more databases 108, and one or more passenger devices 110. For example, via the one or more antenna systems 104, the server 106 and/or the passenger devices 110 may communicate with one or more satellites 112 (e.g., LEO satellites, geostationary satellites), a constellation or network of satellites 112, cell towers 114 or nodes of a cellular network, ground stations 116, other antennas (e.g., extra-vehicular antennas 120), and/or the like. For example, ground stations 116 may include access points for local area networks (e.g., Wi-Fi) located at airport gates, ground control towers, ground-based databases 118 or data servers, other vehicles 102 located on the ground, and/or the like. In some example, one or more extra-vehicular antennas 120 and/or cell towers 114 communicate or interface with the antenna system 104 of the vehicle 102, such that other computer(s), such as ground station 116 and other databases 118, that are connected to the extra-vehicular antennas 120 and/or cell towers 114 (e.g., via the Internet, via a cellular network) can transmit and receive data with the server 106 and other in-vehicle systems. That is, the extra-vehicular antennas 120 and/or cell towers 114 may act as communication nodes between the antenna systems 104 of the vehicle 102 and ground stations 116 and other databases 118. Data provided to in-vehicle systems (e.g., server 106) from ground station 116 and other databases 118 can include data and information related to passengers, airlines or groups (e.g., fleets) of vehicles, weather, and/or the like. Generally, an antenna system 104 may bridge an in-vehicle network (e.g., including server 106, database 108, and passenger devices 110) to other networks. Accordingly, the antenna systems 104 of a vehicle 102 enable the vehicle 102 to communicate via these other extra-vehicular networks with other vehicles, ground stations 116 or servers, and/or the like. In some embodiments, the extra-vehicular antennas 120 are also antenna arrays, and the disclosed technology are applicable and implemented at one or both of the antenna systems 104 and the extra-vehicular antennas 120.

In some embodiments, the vehicle 102 includes an antenna system 104 corresponding to each extra-vehicular network. For example, the vehicle 102 may include a first antenna system used for communicating with a network of satellites 112, a second antenna system used for communicating with a cellular or telecommunications network, a third antenna system for communicating with a local area wireless network (e.g., a Wi-Fi network), and/or the like. While the illustrated example demonstrates that the vehicle 102 may communicate via network connections, the antenna systems 104 also enable the vehicle 102 to form direct communication links with other vehicles and ground stations 116 or servers.

As illustrated, the vehicle 102 includes a server 106 located within the vehicle 102, and the server 106 may communicate with other systems located outside of the vehicle 102 via the antenna systems 104. In some embodiments, the server 106 routes connections provided by the antenna systems 104 to other in-vehicle systems and devices, including passenger devices 110. For example, the server 106 implements a router for the antenna systems 104. In some embodiments, the server 106 implements various functionality disclosed herein to improve thermal load balancing of the antenna systems 104. In particular, the server 106 may be recruited to perform example operations related to optimizing graph paths and determining a minimum number of antenna tiles/elements to activate. In some embodiments, the server 106 cooperates with one or more databases 108 to implement various embodiments disclosed herein. For example, the server 106 pre-determines and stores a plurality of pattern sequences for antenna operation in the databases 108, such that a particular pre-determined pattern sequence may be retrieved and provided to an antenna system 104 for operation. As another example, the server 106 receives, via an antenna system 104, a plurality of pre-determined pattern sequences for antenna operation (e.g., pre-determined by a ground station or server), and stores the pre-determined pattern sequences in the databases 108 for later on-demand use by the antenna systems 104. As yet another example, the server 106 stores various telemetry and data logs that describe temperatures and usages of the antenna systems 104 for analytical operations.

In some embodiments, the server 106 is communicably coupled with the one or more passenger devices 110, for example, via wired and/or wireless connections. In some embodiments, the vehicle 102 includes one or more wireless access points with which the server 106 is communicably coupled, and the server 106 implements an in-flight entertainment and communication (IFEC) installation with which passenger devices 110 may interface.

Figure 1B:
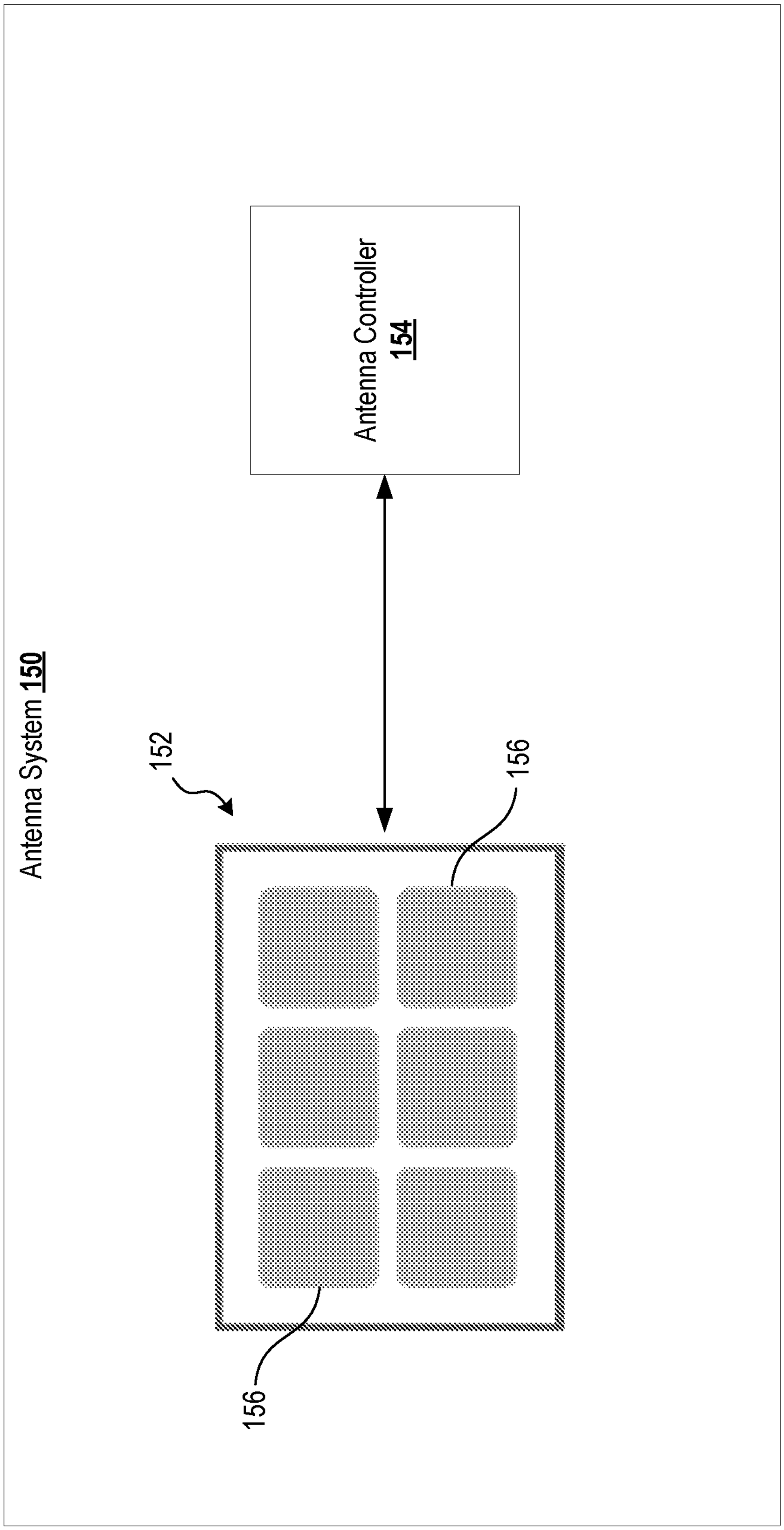
FIG. 1B shows a diagram representative of an example antenna system that is configured to implement embodiments disclosed herein.

FIG. 1B illustrates an example of an antenna system 104. As illustrated, the antenna system 104 may include an antenna panel 152 and an antenna controller 154 that operates the antenna panel 152. The antenna panel 152 includes a plurality of antenna elements that each transmit or receive radio frequency waves and may coordinate together to transmit or receive communication signals. Each of the antenna elements may be any one of monopole antennas, dipole antennas, loop antennas, aperture antennas, and/or the like. In some embodiments, the antenna elements of the antenna panel 152 are identical to one another.

In some embodiments, subsets of antenna elements are assigned to antenna tiles 156, which form individual and discrete operable units of the antenna panel 152. In the illustrated example, the antenna panel 152 includes six antenna tiles, and each antenna tile 156 may include a plurality of individual antenna elements (e.g., ten to a hundred elements, a hundred to five-hundred elements, a hundred to a thousand elements). In some embodiments, the antenna panel 152 may have four antenna tiles, six antenna tiles, nine antenna tiles, twelve antenna tiles, fourteen antenna tiles, or sixteen antenna tiles. In some embodiments, the antenna tiles 156 of the antenna panel 152 are assigned dynamically and in real-time. For example, for a given flight or mission of a vehicle or for a particular environment, the antenna controller 154 may determine that a total number of antenna tiles 156 should be six, and the antenna controller 154 may assign and group individual antenna elements into six antenna tiles.

As shown, the antenna tiles 156 (and the antenna elements therein) form a spatial arrangement spanning across the antenna panel 152. In the illustrated example, the antenna tiles 156 are arranged in a two-by-three arrangement; however, it will be understood that antenna tiles 156 and different numbers thereof may be arranged in different spatial and geometric arrangements.

In some embodiments, the antenna system 104 includes a transmission (TX) aperture and a receive (RX) aperture, with the TX aperture being used to transmit outgoing signals and the RX aperture being used to transmit incoming signals. The TX aperture and the RX aperture may be independently controlled and operated by the antenna controller 154. In some embodiments, the TX aperture and the RX aperture are located in separate antenna panels; for example, the antenna system 104 includes two or more antenna panels 152. In some embodiments, the TX aperture and the RX aperture are located in different and separate regions of a given antenna panel.

The antenna panel 152 (and generally, the antenna system 104 as a whole) may be associated with one or more shutdown temperatures that define thermal temperatures (i.e., a physical temperature) at which the operation and capabilities of the antenna panel 152 with respect to transmitting and receiving signals is detrimentally affected. For example, the antenna panel 152 and antenna elements thereof may suffer permanent damage when operated and activated at the shutdown temperatures. As another example, the antenna panel 152 reaching the shutdown temperature may result in unacceptable noise (e.g., with respect to a pre-defined signal quality requirement) appearing in signals being transmitted and/or received via the antenna panel 152. In some embodiments, each antenna tile 156 of the antenna panel 152 is associated with a respective shutdown temperature that is individually monitored. In some embodiments, the antenna panel 152 as a whole is associated with one shutdown temperature that is monitored. The shutdown temperature(s) of the antenna panel 152 may correlate with physical properties of the antenna elements of the antenna panel 152, for example, a base electrical resistance of each element, a width and/or length of conductive wires in each element, a physical material of which each element is constructed, and/or the like.

In some embodiments, the antenna system 104 further includes one or more temperature sensors that are configured to measure temperatures of the antenna panel 152 and provide temperature data to the antenna controller 154. Via the temperature data provided by the temperature sensors, the antenna controller 154 may implement various techniques disclosed herein to balance thermal load experienced by the antenna panel 152 in real-time and/or dynamically. For example, based on real-time temperature data received from the temperature sensors, the antenna controller 154 causes the ESA to hop between different power modes (each having a unique pattern of activated tiles).

In some embodiments, the antenna controller 154 is configured to operate the antenna panel 152 based on activating electrical power to antenna tiles 156 of the antenna panel 152. In some embodiments, the antenna controller 154 is configured to selectively activate power to certain antenna tiles 156 of the antenna panel 152 without activating power to other antenna tiles 156 of the antenna panel 152. In some embodiments, the antenna controller 154 further implements a modem that processes raw signals received by the antenna panel 152 and that generates raw signals to be emitted by the antenna panel 152. In doing so, the antenna controller 154 may be configured to selectively apply phase offsets to different antenna tiles 156 to "steer" or direct an emitted signal and/or to receive a steered or directed signal.

In some embodiments, the antenna panel 152 is an ESA, and the antenna tiles 156 are operated to electronically steer the ESA. While the following description in this document may refer to ESAs and tiles of an ESA, it will be appreciated that the disclosed concepts are applicable to antenna arrays and elements of an antenna array, generally.

Figure 2:
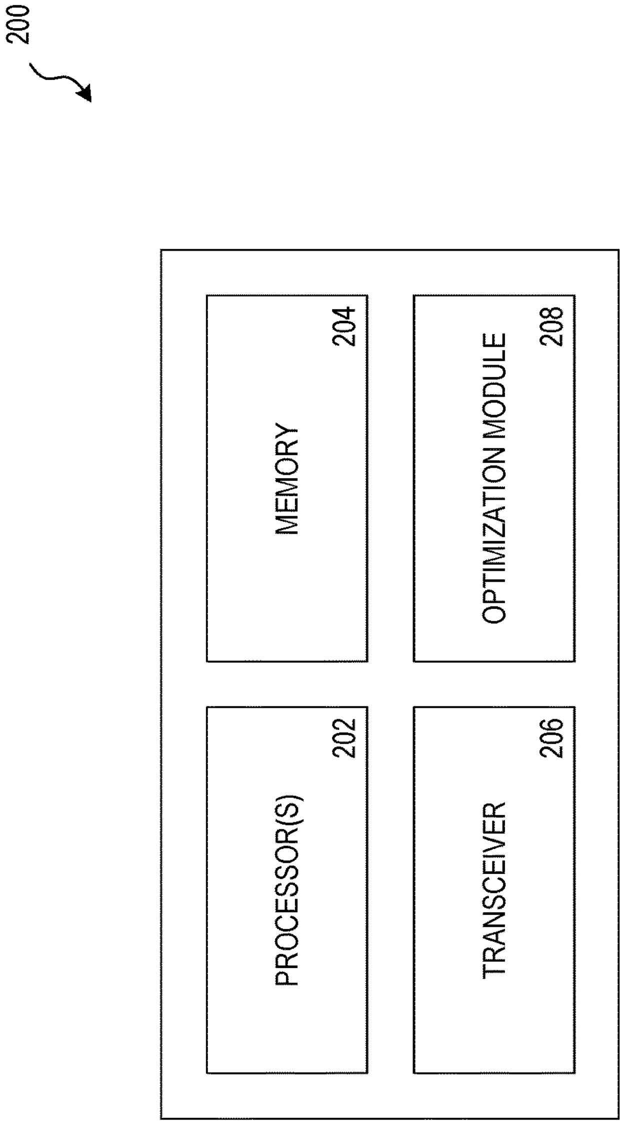
FIG. 2 is a block diagram of a computing device on which embodiments described herein may be implemented, for example, to efficiently operate an ESA with thermal load balancing.

FIG. 2 illustrates an example of a computing device 200 that implements various embodiments disclosed herein. According to example implementations, the computing device 200 may embody the antenna controller 154 of an antenna system 104 and/or a server 106 of a vehicle 102. For example, the computing device 200 performs various example operations to select an optimized sequence of tile patterns, determine a dwelling time for specific patterns in the optimized sequence, and operate an antenna panel according to optimized sequence and dwelling times.

In FIG. 2, the device 200 includes at least one processor 202 and a memory 204 having instructions stored thereupon. The memory 204 may store instructions to be executed by the processor 202. In other embodiments, additional, fewer, and/or different elements may be used to configure the device 200. The memory 204 is an electronic holding place or storage for information or instructions so that the information or instructions can be accessed by the processor 202. The memory 204 can include, but is not limited to, any type of random-access memory (RAM), any type of read-only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 202 configure the device 200 to perform the example operations described in this patent document.

The instructions executed by the processor 202 may be carried out by a special purpose computer, logic circuits, or hardware circuits. The processor 202 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 202 can perform the operations called for by that instruction. The processor 202 operably couples with the memory 204 and transceiver 206 to receive, to send, and to process information and to control the operations of the device 200. The processor 202 may retrieve a set of instructions from a permanent memory device such as a ROM device and copy the instructions in an executable form to a temporary memory device that is generally some form of RAM. In some implementations, the device 200 can include a plurality of processors that use the same or a different processing technology.

The transceiver 206 transmits and receives information or data to another device (e.g., a server 106, passenger devices 110, an antenna controller 154). For example, the transceiver 206 provides demodulated signals received via the antenna system 104 to the server 106 and/or passenger devices 110 and receives raw signals to be sent via the antenna system 104. The transceiver 206 may be comprised of a transmitter and a receiver; in some embodiments, the device 200 comprises a transmitter and a receiver that are separate from another but functionally form a transceiver. In some embodiments, the computing device 200 (and/or the transceiver 206) implements a network router or switch that connects multiple devices to the antenna system 104, such that external communication capability is provided to the multiple devices.

As illustrated, the computing device 200 further includes an optimization module 208. In some embodiments, the optimization module 208 is embodied by a combination of at least a portion of the processor 202 and the memory 204. In some embodiments, the optimization module 208 includes a dedicated processor and a dedicated memory. In some embodiments, the optimization module 208 is a computing device that is included in or connected to the computing device 200. The optimization module 208 is configured to perform (or cause the computing device 200 to perform) example operations disclosed herein for optimizing ESA operation and balancing thermal load experienced by an ESA. In particular, the optimization module 208 may be configured to construct graph structures relating different patterns of antenna tiles 156, determine optimized paths through said graph structures, determine optimal dwelling times for certain tile patterns in a sequence of tile patterns, and/or the like. In order to implement optimization techniques, the optimization module 208 may cooperate with other components of the computing device 200 and/or other systems/devices to obtain current temperature data of an ESA, obtain communication channel information, and/or the like. Thus, the optimization module 208 is configured for various optimization techniques that are implemented by technical solutions disclosed herein.

Figure 3A:
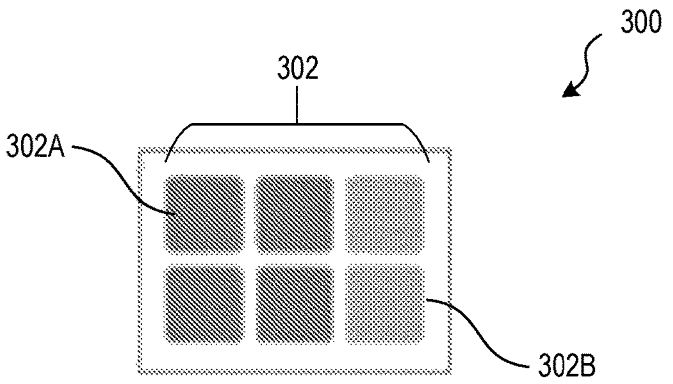
FIG. 3A shows a diagram representation of an example tile pattern for an ESA including a plurality of tiles, according to embodiments disclosed herein.
Figure 3B:
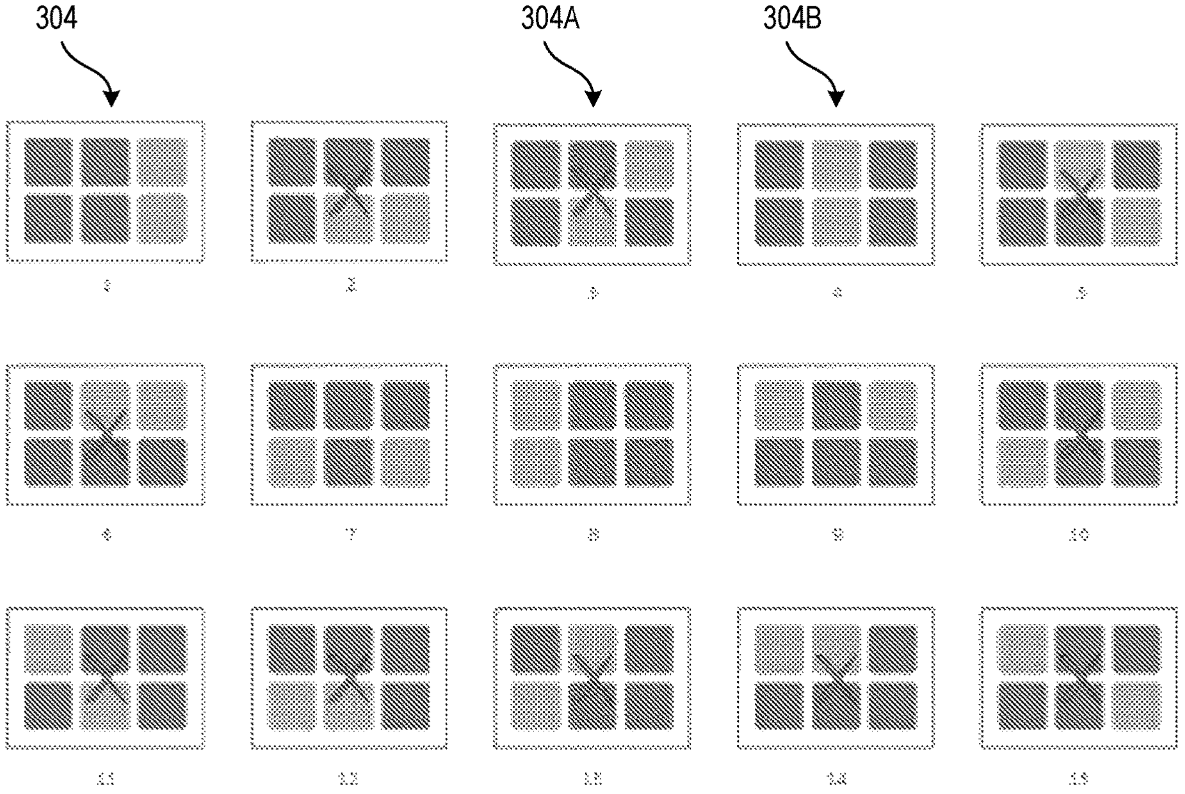
FIG. 3B shows a diagram representative of a plurality of feasible tile patterns for an ESA including a plurality of tiles, according to embodiments disclosed herein.
Figure 3C:
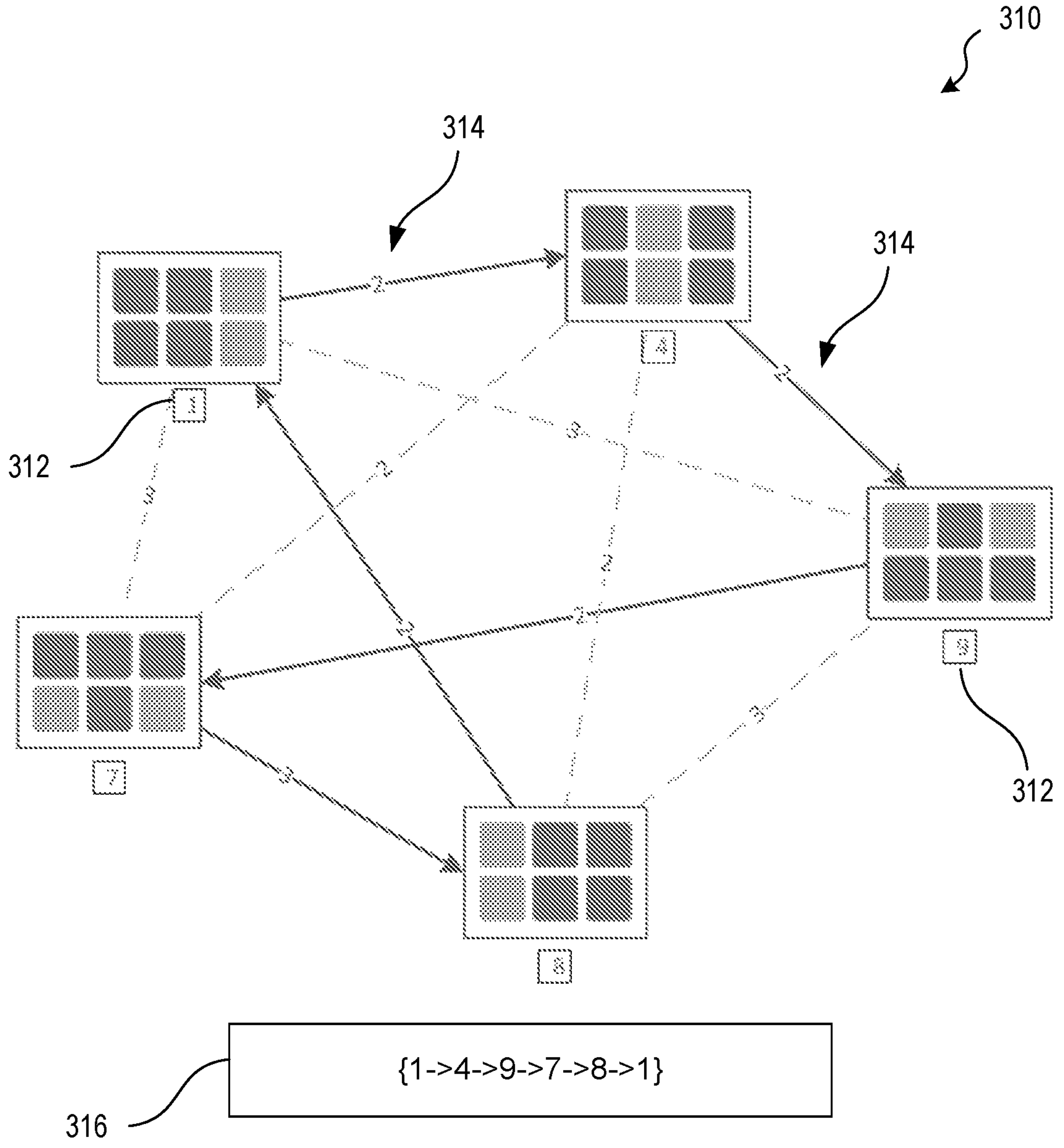
FIG. 3C shows a diagram representative of an optimized path that traverses a set of feasible tile patterns for an ESA including a plurality of tiles, according to embodiments disclosed herein.

Turning now to FIGS. 3A-3C, optimization techniques performed by the optimization module 208 for thermal load balancing an ESA are demonstrated. According to example embodiments, the demonstrated optimization techniques may be performed to select an optimized sequence for powering specific antenna tiles 156 of an ESA in a manner that maximizes expected time for the ESA to reach shutdown temperature. For ease of description, the following description is provided with respect to a transmission chain via the ESA; however, it will be understood that the disclosed concepts are applicable to the receive chain of the ESA.

Thermal load balancing according to example embodiments may be performed according to a reduced service mode being set for the ESA, and the optimization module 208 may perform the following operations for the reduced service mode. In some embodiments, the reduced service mode is a mode of operation for the ESA in which thermal load balancing is implemented, and the reduced service mode may be set based on a determination that thermal load balancing is necessary. For example, the reduced service mode may be set in response to a determination that an ambient temperature of an environment in which the ESA is located has exceed a pre-defined threshold, and that the ESA is at risk of quickly reaching its shutdown temperature without thermal load balancing being performed.

In some embodiments, the optimization module 208 determines a minimum number of antenna tiles to be powered to meet a target signal-to-noise ratio (SNR). The minimum number of antenna tiles is dependent at least in part on a relative location of a target system (e.g., a LEO satellite). For example, the minimum number of antenna tiles may be lower when communicating with a target system that is normal to a planar area or surface of the ESA, while the minimum number of antenna tiles may be higher for a target system that is near the horizon with respect to the planar area or surface of the ESA. Accordingly, in some embodiments, the optimization module 208 is configured to obtain position information for a target system to determine the minimum or reduced number of antenna tiles. In some embodiments, the minimum number of antenna tiles is determined based on at least one of a transmit power requirement or a receive power requirement, said requirements corresponding to the target SNR.

FIG. 3A illustrates an example of an ESA 300 that includes a total N number of tiles 302, with N=6 in the illustrated example. According to the illustrated example, the optimization module 208 has determined that the minimum or reduced M number of tiles that meets the target SNR is four (M=4), with the ESA 300 having four activated tiles 302A and two in-active tiles 302B.

In some embodiments, the optimization module 208 generates an exhaustive list of all possible M-from-N tile patterns. The number of possible tile patterns or permutations may be defined as $$S = \frac{N!}{M!\,(N-M)!}.$$

Accordingly, in the illustrated example in which N=6 and M=4, then the number of possible tile patterns is fifteen (S=15). FIG. 3B illustrates each of the fifteen possible tile patterns 304, with each possible tile pattern 304 specifying a unique permutation or arrangement of activated tiles 302A.

In some embodiments, the optimization module 208 analyzes each possible tile pattern 304 to determine whether a possible tile pattern 304 complies with one or more requirements and constraints. In particular, in some embodiments, the requirements and constraints include a symmetry requirement, in which an arrangement of activated tiles 302A in a possible tile pattern 304 must be symmetrical. Because of this symmetry requirement, resulting beam geometry may be compliant and reliable. The symmetry requirement may be associated with polarization and power constraints associated with the ESA, due to asymmetrical tile patterns requiring more power to emit a signal without significant noise, in some examples. FIG. 3B illustrates an example of an asymmetrical tile pattern 304A and a symmetrical tile pattern 304B. In some embodiments, the optimization module 208 classifies certain ones of the possible tile patterns 304 (e.g., the symmetrical tile patterns 304B) as feasible and eliminates the remaining ones of the possible tile patterns 304 (e.g., the asymmetrical tile patterns 304A). In the illustrated example of FIG. 3B, the optimization module 208 eliminates ten of the possible tile patterns 304 due to non-compliance thereof with the symmetrical requirement.

As shown in FIG. 3C, the optimization module 208 then constructs a graph 310, in some embodiments. The graph 310 includes nodes 312 and edges 314. The nodes 312 of the graph 310 correspond to the possible tile patterns 304 classified as feasible (e.g., symmetrical tile patterns 304B). The edges 314 of the graph 310 define a number of shared or common tiles between respective tile patterns. For example, between the nodes 312 labelled "1" and "4," the respective tile patterns share two common tiles, and the particular edge between Node 1 and Node 4 accordingly indicates the value 2. Likewise, the particular edge between Node 9 and Node 8 indicates that the respective tile patterns of Node 9 and Node 8 share three common tiles. Accordingly, if two tile patterns are non-overlapping, an edge between the corresponding two nodes would define a value of zero. The edges 314 of the graph 310 are directionless.

In some embodiments, the optimization module 208 then calculates the shortest path that traverses the graph. Specifically, the optimization module 208 searches for a path that visits each node exactly once and returns to the original node, with the path having a minimized "distance" or total edge value. It may be appreciated that this path resembles a solution to the Traveling Salesman problem. Thus, for example, one solution is to exhaustively compare lengths for all possible paths. For a graph 310 with X number of nodes 312, there exist at most (X−1)! possible paths. Other path optimization solutions may be implemented.

The shortest path solution then may describe a cyclic power sequence among the feasible tile patterns by which the ESA can be operated. In FIG. 3C, the shortest path 316 visits in order Node 1, Node 4, Node 9, Node 7, Node 8, and back to Node 1, and each of these nodes corresponds to a tile pattern. Due to the shortest path 316 being minimized with respect to edge values, the number of shared tiles between consecutive tile patterns in the sequence is minimized. Accordingly, when switching from a given tile pattern to the subsequent tile pattern, a maximum number of tiles are inactivated to allow for said tiles to cool and rest. Any given tile of the ESA has its cooling or resting time maximized by way of the shortest path 316. In some embodiments, the ESA is operated according to the cyclic power sequence in a cyclic or repeated manner while in the reduced service mode and/or until a stop command is received. In some embodiments, after exiting the reduced service mode and/or receiving a stop command, the ESA is operated under normal conditions, for example, with all of the tiles being activated or powered.

Therefore, in some embodiments, the optimization module 208 determines a dynamic power sequence for an ESA according to graph minimum path. In some embodiments, this dynamic power sequence is pre-determined by the optimization module 208 and stored in association with the M and N parameters. In some embodiments, the optimization module 208 pre-determines an optimized sequence of tile patterns for each value of M for a given N total number of tiles in a given ESA. In some embodiments, the optimization module 208 is provided with optimized sequences corresponding to one or more values of M by a ground server, another vehicle, and/or the like.

In some embodiments, the ESA is powered according to a given tile pattern in the optimized power sequence for a respective dwelling time. For example, when the ESA powers up, the ESA enters a first power mode (that is, apply power to a first tile pattern in the optimized power sequence). The ESA dwells in the first power mode for a first time period T1, and then the ESA switches to a second power mode (that is, stop power to the first tile pattern, apply power to a second tile pattern in the optimized power sequence). The ESA dwell in the second power mode for a second time period T2, and continues through the optimized power sequence.

In some embodiments, the respective dwelling times (e.g., first time period T1, second time period T2) are determined based on information associated with a communication channel (e.g., a radio frequency channel) within which the ESA transmits or receives signals. For example, for time-slotted waveforms (e.g., TDMA, Mx-DMA), the dwelling time may be set equal to the integer number of time slots, as indicated by time division information associated with the communication channel, or channel characteristic information generally. For example, when deployed with Mx-DMA, T1=T2= . . . =n seconds. In some embodiments, the respective dwelling times are determined based on the shutdown temperature of the ESA. For example, for continuous time waveforms (e.g., CDMA, DVB-SX), the dwelling time in a particular tile pattern may be calculated as a function of estimated time for the tile set to reach shutdown temperature. Tile temperatures are sampled periodically, for example, via the temperature sensors of the antenna system, and the tile pattern's temperature is the highest temperature among all its tiles. Accordingly, in some embodiments, the antenna system may include a temperature sensor for each tile. For example, at the start of a first power mode, the temperature of a first tile pattern is 50° C., and the shutdown temperature of the antenna system is 75° C. The ESA may dwell in the first tile pattern until the temperature of the first tile pattern is 55° C., based on the total number of patterns in the power sequence, an offset from the shutdown temperature, the ambient temperature, the predicted temperature gradient, and/or the like. In some embodiments, the dwelling times for power sequences for the TX aperture and for the RX aperture may be independent.

Figure 4:
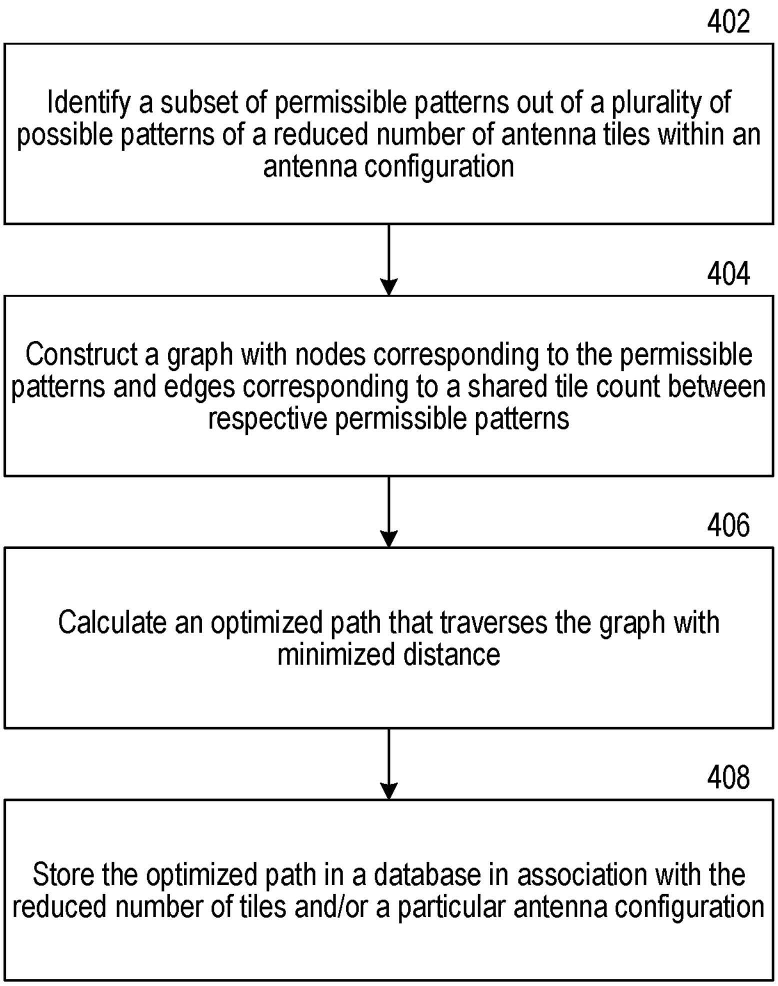
FIG. 4 is a flowchart for an example process of determining a thermal optimization of an ESA, according to embodiments disclosed herein.

Turning now to FIG. 4, an example method 400 for determining an optimization for ESA operation is illustrated. For example, the method 400 may be performed by an antenna controller that operates an ESA. In some embodiments, the method 400 may be performed in advanced of the ESA requiring thermal load balancing, such that the optimization for ESA operation is pre-determined. In some embodiments, the method 400 is performed on demand to determine the optimization for ESA operation based on current states and usages of the ESA.

At 402, the antenna controller identifies a subset of feasible, permissible, or compliant tile patterns out of a plurality of possible tile patterns, with each possible tile pattern having a reduced number of antenna tiles within an antenna configuration. For example, the antenna controller identifies the feasible, permissible, or compliant tile patterns based on a spatial symmetry (or lack thereof) across the specific tiles of each pattern. In some embodiments, alternative or in addition to spatial symmetry requirements, the subset of patterns is identified based on a number of shared tiles. For example, a maximum shared tile count is defined, and any tile pattern of the possible tile pattern that has at least the maximum shared tile count with any other tile pattern is eliminated from the subset. FIG. 3B demonstrates the identification of a subset of tile patterns out of a plurality of possible tile patterns. In some embodiments, the identification of a subset of tile patterns promotes efficiency and feasibility of subsequent graph construction and path optimization operations.

At 404, the antenna controller constructs a graph with nodes corresponding to the permissible patterns and edges corresponding to a shared tile count between respective permissible patterns. In order to do so, in some embodiments, each feasible or permissible tile pattern is associated with a unique identifier, which the antenna controller correlates or associates with a node of the graph. FIG. 3C illustrates an example of a graph constructed by the antenna controller at 404.

At 406, the antenna calculates an optimized path that traverses the graph with minimized distance. Because edge distances or lengths are defined according to shared tile count, minimization of path length corresponds to a minimization of shared tiles between consecutive tile patterns in the path. The optimized path may visit each node of the graph exactly once before returning to an original node. By including every node of the graph (or, every permissible tile pattern), there are more unique patterns to hop between, which maximizes inactivity time for a given tile. In some embodiments, a Traveling Salesman solution is used to calculate the optimized path. FIG. 3C indicates an example optimized path that traverses a graph with minimized distance.

At 408, the antenna controller stores the optimized path in a database (e.g., database 108 in FIG. 1A) in association with the reduced number of tiles and/or a particular antenna configuration. For example, the antenna controller pre-calculates or pre-determines the optimized path and stores the optimized path for later use in ESA operation when triggered. In some embodiments, the database stores a plurality of optimized paths. Because the optimized path is unique to the graph which is constructed primarily based on a reduced number of antenna tiles and an antenna configuration (e.g., a total number of antenna tiles and geometric layout or spatial arrangement thereof), the database may store the optimized path in reference to the reduced number of antenna tiles and the antenna configuration. Therefore, given a reduced number of antenna tiles and an antenna configuration, a specific optimized path may be retrieved from the database. In some embodiments, the antenna controller further determines dwelling times for patterns in the optimized path and stores the dwelling times with the optimized path in the database.

Figure 5:
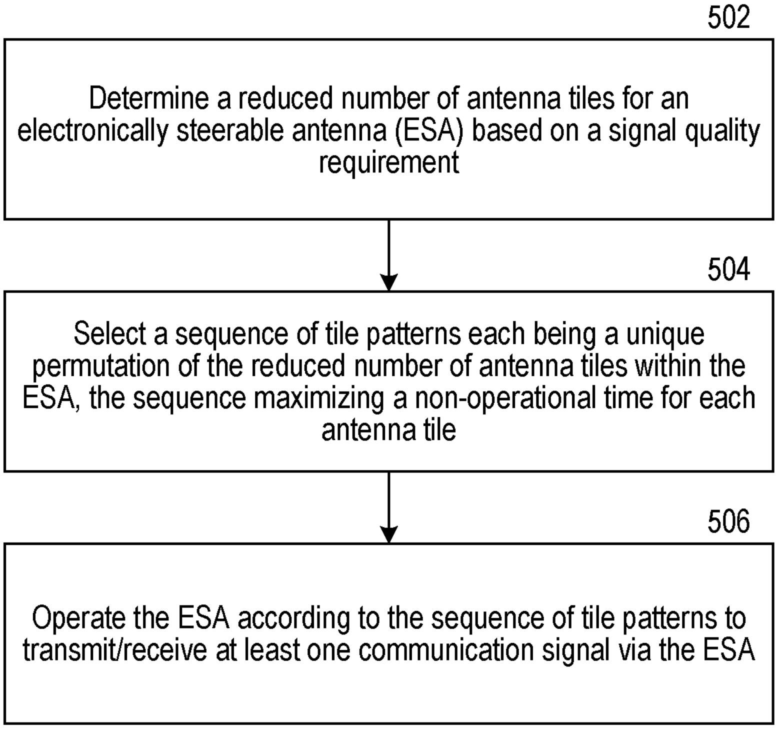
FIG. 5 is a flowchart for an example process of optimizing operation of an ESA, according to embodiments disclosed herein.

FIG. 5 illustrates an example method 500 for thermal load balancing an ESA. The example method 500 may be implemented by an antenna system to maximize an expected time before the antenna system reaches a shutdown temperature. In particular, the antenna system includes an ESA that includes antenna tiles operable in coordination with one another to emit and/or receive directed communication signals, and the antenna system further includes an antenna controller device that performs the method 500 to maximize an expected time before the ESA reaches a shutdown temperature. In some embodiments, the ESA is located on an aircraft, and the method 500 may be performed to improve communication capability between the aircraft and target systems, including ground stations and satellites.

At 502, the antenna controller device determines a reduced number of antenna elements that minimally satisfies a signal quality requirement with respect to a target system. For example, the target system is a LEO satellite, and the reduced number of antenna elements is determined based on a position of the LEO satellite relative to the ESA and a target SNR for communicating with the LEO satellite.

At 504, the antenna controller device selects a sequence of tile patterns each being a unique permutation of the reduced number of antenna tiles within the ESA. The sequence of tile patterns maximizes a non-operational time for each antenna tile. According to some embodiments, the antenna controller device selects the sequence of tile patterns based on performing method 400 of FIG. 4. In some embodiments, the antenna controller device selects the sequence of tile patterns from a plurality of sequences stored in a database. In connection with the selection of a sequence of tile patterns, the antenna controller device may determine a dwelling time for each tile pattern in the sequence. In some embodiments, the sequence of tile patterns is a plurality of tile patterns; that is, the antenna controller device selects a plurality of tile patterns. In some embodiments, the plurality of tile patterns does not imply a specific order or priority among the tile patterns.

At 506, the antenna controller device operates the ESA according to the sequence of tile patterns to transmit/receive at least one communication signal via the ESA. In particular, the antenna controller device powers specific tiles of the ESA according to a first tile pattern of the sequence for a first time period, followed by powering specific tiles of the ESA according to a subsequent tile pattern of the sequence for a second time period, and so on.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media, and the computer-executable instructions may be stored in the non-transitory storage media, in some embodiments. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The various embodiments introduced herein can be implemented by, for example, programmable circuitry (e.g., one or more microprocessors, programmed with software and/or firmware), or entirely in special-purpose hardwired circuitry (e.g., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc. In some embodiments, the methods may be stored in the form of computer-executable instructions that are stored on a computer-readable medium. Alternatively, or in addition, cloud-based computing resources may be used for implementing the embodiments.

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying claims.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method for an electronically steerable antenna (ESA) of a commercial passenger vehicle, the method comprising:

determining, by an antenna controller, a particular M number of antenna tiles of the ESA, which includes a total N number of antenna tiles, for transmitting or receiving at least one communication signal via the ESA to or from a communications satellite, the particular M number of antenna tiles being less than the total N number of antenna tiles;

selecting, by the antenna controller, an optimized sequence of unique tile patterns of the particular M number of antenna tiles out of the total N number of antenna tiles, wherein the optimized sequence corresponds to an optimized path that traverses a graph having (i) nodes corresponding of the unique tile patterns and (ii) edges that define a count of shared tiles between different unique tile patterns, wherein the optimized path minimizes a count of shared tiles between consecutive tile patterns; and operating, by the antenna controller, the ESA according to the optimized sequence of unique tile patterns to transmit or receive the at least one communication signal via the ESA.

2. The method of claim 1, further comprising:

determining a dwelling time for each unique tile pattern in the optimized sequence, wherein operating the ESA includes, for a given unique tile pattern in the optimized sequence, powering tiles defined by the given unique tile pattern for at least the dwelling time.

3. The method of claim 2, wherein the dwelling time for each unique tile pattern is determined based on a maximum shutdown temperature associated with the ESA.

4. The method of claim 2, wherein the dwelling time for each unique tile pattern is determined based on time division information for a radio frequency channel with the communications satellite.

5. The method of claim 2, wherein the dwelling time for each unique tile pattern is determined based on real-time temperature data received from one or more temperature sensors configured to measure a temperature of the antenna tiles of the ESA.

6. The method of claim 1, wherein the optimized sequence of unique tile patterns is selected from a database communicatively coupled to the antenna controller, the database storing a plurality of pre-determined optimized sequences in association with different particular M numbers of antenna tiles.

7. The method of claim 1, wherein selecting the optimized sequence of unique tile patterns comprises:

identifying the unique tile patterns from a plurality of possible tile patterns of the particular M number of antenna tiles, wherein the unique tile patterns are identified from the possible tile patterns according to a pattern symmetry constraint;

generating the graph for the unique tile patterns;

determining the optimized path that traverses the graph using an optimization technique; and storing, in a database, the optimized path in association with the particular M number and the total N number.

8. The method of claim 1, wherein the particular M number of antenna tiles is determined based on a relative position of the communications satellite with respect to the vehicle.

9. The method of claim 1, wherein the method is performed by the antenna controller based on a reduced service mode being set in response to an ambient environment temperature exceeding a threshold.

10. An antenna controller for operating an electronically steerable antenna (ESA) of a commercial passenger vehicle comprising one or more processors, wherein the one or more processors are configured to read instructions from a memory and implement a method comprising:

determining, by the antenna controller, a particular M number of antenna tiles of the ESA, which includes a total N number of antenna tiles, for transmitting or receiving at least one communication signal via the ESA to or from a communications satellite, the particular M number of antenna tiles being less than the total N number of antenna tiles;

selecting, by the antenna controller, an optimized sequence of unique tile patterns of the particular M number of antenna tiles out of the total N number of antenna tiles, wherein the optimized sequence corresponds to an optimized path that traverses a graph having (i) nodes corresponding of the unique tile patterns and (ii) edges that define a count of shared tiles between different unique tile patterns, wherein the optimized path minimizes a count of shared tiles between consecutive tile patterns; and operating, by the antenna controller, the ESA according to the optimized sequence of unique tile patterns to transmit or receive the at least one communication signal via the ESA.

11. The antenna controller of claim 10, wherein the method further includes:

determining a dwelling time for each unique tile pattern in the optimized sequence, wherein operating the ESA includes, for a given unique tile pattern in the optimized sequence, powering tiles defined by the given unique tile pattern for at least the dwelling time.

12. The antenna controller of claim 11, wherein the dwelling time for each unique tile pattern is determined based on a maximum shutdown temperature associated with the ESA.

13. The antenna controller of claim 11, wherein the dwelling time for each unique tile pattern is determined based on time division information for a radio frequency channel with the communications satellite.

14. The antenna controller of claim 11, wherein the dwelling time for each unique tile pattern is determined based on real-time temperature data received from one or more temperature sensors configured to measure a temperature of the antenna tiles of the ESA.

15. The antenna controller of claim 10, wherein the optimized sequence of unique tile patterns is selected from a database communicatively coupled to the antenna controller, the database storing a plurality of pre-determined optimized sequences in association with different particular M numbers of antenna tiles.

16. The antenna controller of claim 10, wherein selecting the optimized sequence of unique tile patterns comprises:

identifying the unique tile patterns from a plurality of possible tile patterns of the particular M number of antenna tiles, wherein the unique tile patterns are identified from the possible tile patterns according to a pattern symmetry constraint;

generating the graph for the unique tile patterns;

determining the optimized path that traverses the graph using an optimization technique; and storing, in a database, the optimized path in association with the particular M number and the total N number.

17. The antenna controller of claim 10, wherein the particular M number of antenna tiles is determined based on a relative position of the communications satellite with respect to the vehicle.

18. The antenna controller of claim 10, wherein the method is performed by the antenna controller based on a reduced service mode being set in response to an ambient environment temperature exceeding a threshold.

* * * * *